INVENTOR.
FORREST W. DIETRICH
BY Ralph C. Pastoriza
ATTORNEY

Sept. 16, 1958  F. W. DIETRICH  2,852,210
INERTIA SPOILER CONTROL FOR AIRCRAFT
Filed Nov. 3, 1955  2 Sheets-Sheet 2

United States Patent Office 2,852,210
Patented Sept. 16, 1958

2,852,210

INERTIA SPOILER CONTROL FOR AIRCRAFT

Forrest W. Dietrich, Los Angeles, Calif., assignor to Aerophysics Development Corporation, a corporation of California Application November 3, 1955, Serial No. 544,766

5 Claims. (Cl. 244—42)

This invention relates generally to spoilers for aircraft, and more particularly to a novel aerodynamic servo assist spoiler arrangement for use with a variable flap dwell control system.

The principles of guiding aircraft and missiles by time modulated command signals which serve to hold an oscillating flap in one extreme position for a longer period than in the other, are well known. While the drag on a missile as a result of an oscillating flap is increased, this disadvantage is overcome by the nicety of control afforded by the use of time modulated signals. The time modulation itself can be precisely controlled so that the average length of time the flap is in one position as compared to the average length of time it assumes its other position may be controlled with equal precision. Generally, such time modulated flap dwell control systems make use of a spoiler at the trailing edge of the flap to serve as an aerodynamic servo assistant to the oscillatory movement of the flap. Conventionally, such a spoiler is mechanically or electrically driven for this purpose.

The present invention has as its primary object the provision of an aerodynamic servo assist spoiler in which the need for an auxiliary drive for operating the same is avoided, thereby providing a less complex, more reliable, and more economical spoiler assist arrangement.

More particularly, an object is to provide an aerodynamic servo assist spoiler so designed that it will operate entirely automatically and mechanically independently of the primary flap driving system.

Another important object of this invention is to provide an aerodynamic servo spoiler which will actually serve to drive a principal flap control surface in an arcuate oscillatory movement without any external driving energy being applied to the system after the flap movement has once been initiated.

These and other objects and advantages of this invention are achieved by a spoiler means including a deflecting element and guiding means for coupling the element to the flap control surface in such a manner that it is free to move between its operative positions above and below the trailing edge of the flap control surface. The physical parameters of the spoiler means are such that the natural inertia of the spoiler results in its lagging the trailing edge of the control surface to establish a desired aerodynamic pressure difference. This pressure difference augments oscillatory movement of the flap control surface.

In a preferred embodiment of the invention, the guiding means for coupling the deflecting element to the flap comprises an elongated cantilevered rod having its fixed end secured within the flap control surface forward of the trailing edge, and its free end secured to the deflecting element for cantilevering movement in the plane of the arcuate oscillatory movement of the flap control surface. The arrangement is such that the mass of the deflecting element and bending moment of the cantilevering rod result in a natural mechanical frequency of the spoiler means differing from the oscillatory frequency of the flap control surface so that changes in the period of time at which the flap dwells in one position as compared to the other may be relatively large and still permit the inertia effect to hold the spoiler in the desired position.

The aerodynamic boost realizable by the spoiler system of the invention may be such that once oscillatory movement of the principal flap has been initiated, the action of the spoiler creates sufficient aerodynamic pressure differences to maintain the flap in an oscillating condition without the aid of any external drive means.

A better understanding of the invention will be had by referring to the accompanying drawings illustrating the preferred embodiment thereof and in which.

Figure 1:
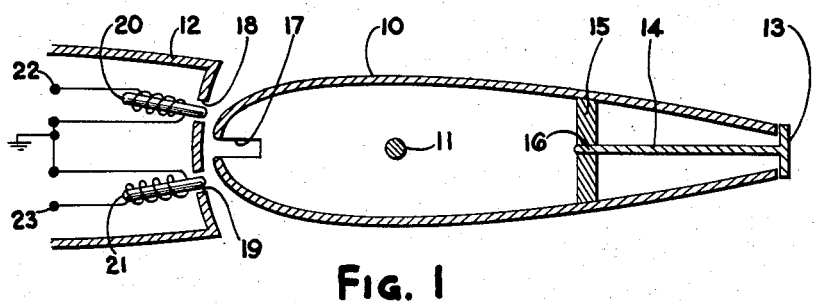
Figure 1 is a highly schematic cross sectional view of a flap control surface incorporating the spoiler means of the present invention.

Referring to Figure 1, there is shown a flap control surface 10 adapted to oscillate about a conventional hinge 11 associated with a main airfoil surface 12. The guidance of the aircraft or missile (not shown) of which the main airfoil 12 is a part is accomplished by oscillating the flap control surface 10 about the hinge 11 at a frequency of the order of magnitude of six cycles per second. Command signals for controlling the airfoil 12 by means of the flap 10 are in the form of time modulated square waves which serve, through driving and locking relays, to vary the average length of time the flap is in one position as compared to its other, whereby a net aerodynamic force serves to guide the missile or aircraft in the desired path.

In accordance with the present invention, the novel spoiler means for aerodynamically assisting the above described oscillatory movement of the flap 10, comprises a deflecting element or spoiler 13 adjacent the trailing edge of the flap, coupled to the flap by any suitable guide means so that the element is free to move above and below the trailing edge of the flap. As shown, one guide means for coupling the deflecting element takes the form of an elongated cantilevered rod 14 having its fixed end rigidly secured to a cross piece 15 as at 16, and its free end secured to the deflecting element 13.

Figure 2:
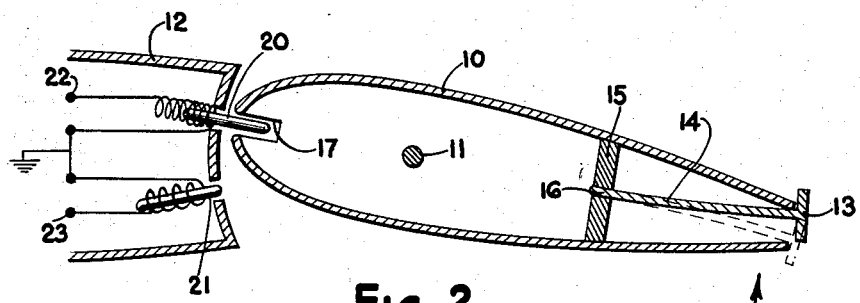
Figure 2 is a view similar to Figure 1 showing the flap control surface at one extreme position.
Figure 3:
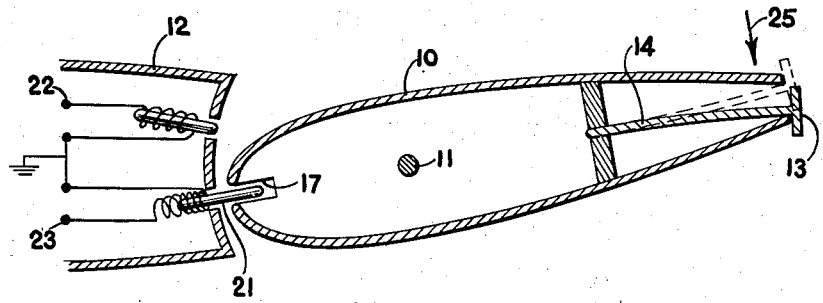
Figure 3 shows the flap control surface in its other extreme position.

In the embodiment shown in Figures 1, 2, and 3, no driving mechanism for moving the flap back and forth between its extreme positions is illustrated inasmuch as the particular spoiler means to be described is sufficient to aerodynamically sustain such oscillatory movement once it has been initiated. It is necessary however, that a holding means be provided in order to vary the dwell time of the flap. For this purpose, the leading edge of the flap 10 is provided with a slot or opening 17 adapted to register with corresponding openings 18 and 19 in the main airfoil 12 when the flap is in its opposite extreme positions. A holding means in the form of solenoid plungers 20 and 21 electrically energized through terminals 22 and 23 respectively, serves to retain the flap 10 in one or the other of its extreme positions by projecting into the opening 17 as illustrated in Figures 2 and 3. The length of time the flap 10 dwells in one position or the other is controlled by a time modulated square wave applied to the terminals 22 and 23.

Figure 4:
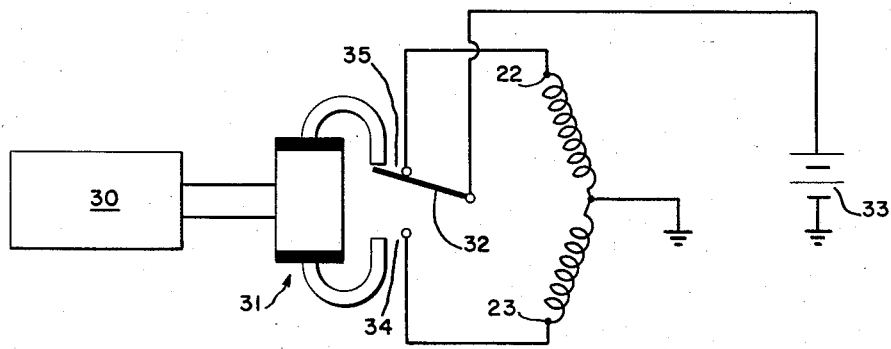
Figure 4 shows a schematic view of an electrical control arrangement for energizing the solenoids shown in Figures 1 to 3.

The time modulated square wave is supplied by a conventional square wave pulse generator 30 and is applied to the terminals of the polarized relay indicated generally at 31 in Figure 4. The particular square wave generator utilized to produce the desired control signal forms no part of the present invention and any conventional square wave generator may be employed. However, it is desirous to use a square wave generator having an arrangement to vary the pulse width of the positive half of the cycle with respect to the negative half of the cycle so as to effect varying dwell time of the solenoids. The moving contact 32 of the polarized relay has one end connected to a battery 33 for alternately delivering a direct current pulse to the terminal 22 of one of the solenoids and terminal 23 of the other solenoid through stationary contacts 34 and 35. The actual physical configuration and structure of the polarized relay also forms no part of the invention and other equivalent means may be utilized to provide a time modulated square wave for effecting energization of the solenoid sequentially. The time modulated square wave need only be capable of having its pulse width varied. Energization of the polarized relay 31 will cause the moving contact 32 to move to either of the stationary contacts 34 or 35 depending upon whether the signal applied to the relay 31 is positive or negative. The frequency of the time modulated control signal applied to the polarized relay 31 is correlated to the frequency of the arcuate oscillatory movement of the control surface which is determined by the various constructional features and characteristics of the control surface and the spoiler means.

As shown in Figure 2 the solenoid plunger 20 has locked the leading edge of the flap control surface 10 in one extreme position in accordance with a signal applied to the terminals 22. In Figure 3, the flap control surface 10 is shown held in its other extreme position by the solenoid plunger 21 as a result of a signal applied to the terminals 23.

In operation, assume that the flap control surface is in the position shown in Figure 2 at a given instance of time during its normal arcuate oscillatory movement. The deflecting element 13 will be in its solid line position an instant before the flap 10 reaches such position and when the flap stops or dwells in this position, the inertia of the element will tend to keep it moving towards the dotted line position shown. When the element 13 reaches the dotted line position, it will project into the air stream passing under the flap 10 resulting in a net upward aerodynamic pressure as indicated by the arrow 24. By this time, the solenoid plunger 20 has been retracted from the leading edge opening 17 whereby the flap 10 is free to rotate about the hinge 11 in a counterclockwise direction as a result of the force 24. Upon upward movement of the trailing edge of the flap 10 as a result of this rotation, the deflecting element 13 will remain in its dotted line position due to its starting inertia. This inertia will serve to retain the deflecting element 13 in its dotted line position so that the net aerodynamic pressure 24 will continue to rotate the flap 10 about the hinge 11 in a counterclockwise direction until it assumes the position shown in Figure 3 in which position, the solenoid plunger 21 will enter the opening 17 to hold the flap for the desired dwell time. When the flap is stopped in this position, the deflecting element will continue to move by its inertia from the solid position shown in Figure 3 to the dotted line position.

When in the dotted line position shown in Figure 3, the air flow over the top surface of the flap 10 will react with the spoiler to create a net downwardly directed aerodynamic pressure difference as indicated by the arrow 25. By this time, the solenoid plunger 21 will be retracted from the opening 17 to leave the flap 10 free to rotate in a clockwise direction about the hinge 11. The starting inertia of the deflecting element 13 will then serve to retain the element in the dotted line position shown in Figure 3 as the flap 10 rotates in a clockwise direction as a result of the pressure 25.

The period of dwell time, as determined by the length of time the solenoid plungers 20 and 21 are energized, is small compared to any natural mechanical resonant period of the deflecting element as a result of the cantilevered supporting rod 14. Stated differently, any natural resonant frequency exhibited by the spoiler means is low compared to the frequency of flap oscillation. Therefore, motion of the flap 10 will reverse before any natural restoring properties of the cantilevered rod 14 have a chance to come into play for more than a half cycle. Thus, the deflecting element 13 will be in either the solid or dotted line position throughout the arcuate movement of the flap between its extreme positions, and will only shift once from its solid to dotted or from its dotted to solid line positions during the dwell periods of the flap at its extreme positions.

Figure 5:
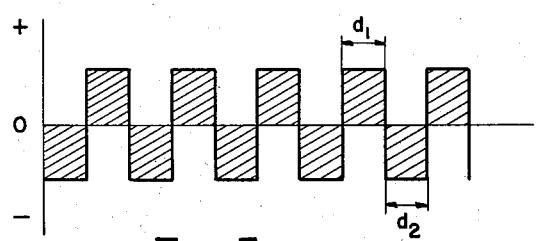
Figure 5 shows a square wave control signal having equal pulse widths for actuating the polarized relay of Figure 4.
Figure 6:
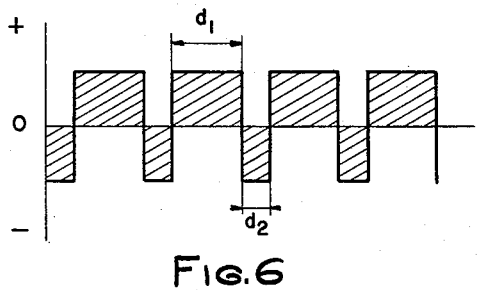
Figure 6 shows a square wave control signal having unequal pulse widths for actuating the polarized relay of Figure 4.

Because the time required for the deflecting element 13 or spoiler to shift from one of its solid to its dotted lines or vice versa is always greater than any time required for the control surface to dwell at either of its extreme positions, the length of time that the control surface will be held in either extreme position may be varied to a degree allowing a dwell period in one of the extreme positions to be of a sufficiently greater time than in the other dwell position to effect a control function. In particular, it is a desirous feature of this invention to be able to vary the dwell time of the control surface in either of the two extreme positions in order to utilize this control function to its fullest extent. As such, the control functions will be limited only by the time required for the deflecting element or spoiler 13 to move from its biased neutral position to a position where it will be above or below the control surface. While the aerodynamic pressure difference as indicated by the arrows 24 and 25 will be the greatest when the spoiler or deflecting element is at its extreme deflected position, it will be readily seen that some pressure difference will always exist when the spoiler is at any but its neutral position. Thus, it can be readily seen that the dwell position of the control surface in either of its two extreme positions may be varied through a somewhat limited range to effect the desired control function. The ability to vary the dwell periods, is illustrated graphically in Figures 5 and 6 showing alternating current signals which are fed to the polarized relay 31. Figure 4 shows a time modulated square wave signal having pulse widths $d_1$ and $d_2$ which are of like duration, therefore the control surface will oscillate between the two extreme positions, and the time of dwell in one of the extreme positions will be identical to the dwell time in the other position. The control surface will dwell in either of the two locked extreme arcuate positions until its associated release solenoid is energized. This occurs when the wave form changes from its maximum value of one polarity to its maximum value of reverse polarity. Figure 5 shows a time modulated square wave control signal which is fed to the polarized relay 31 having a pulse width time $d_1$ which is much greater than pulse width $d_2$. This will result in a delay in energization of the solenoid operating under the narrow pulse width portion of the wave and an acceleration in energization of the other solenoid. The final effect is a locking or holding of the control surface in one of the extreme arcuate positions for a greater period of time than in the other extreme position and achievement of a desirous control function.

The aerodynamic net pressure difference as indicated by the arrows 24 and 25 may be made sufficient, by means of proper spoiler design, to actually drive the flap 10 in its oscillatory movement, once such movement has been initiated. In cases where a positive driving system is employed to oscillate the flap, the cantilevered spoiler will serve to augment the required driving forces considerably so that very little energy is necessary to operate the variable dwell flap control system.

While the spoiler apparatus has been described with reference to a specific embodiment, it is to be understood that modifications may be made that fall within the scope and spirit of the invention. For example, any suitable supporting or guiding means for the deflecting element 13 may be used in place of the cantilevered rod 14. It is only necessary that the deflecting element be free to move or slide in response to its own inertia back and forth above and below the trailing edge of the flap in the plane of the oscillatory movement of the flap. The spoiler control is, therefore, not to be thought of as limited to the specific apparatus shown for illustrative purposes.

What is claimed is:

1. In combination: an airfoil; a control surface for said airfoil; hinge means coupling said control surface to said airfoil for limited arcuate oscillatory movement of given frequency with respect to said airfoil; spoiler means adjacent the trailing edge of said control surface for movement above and below the control surface; coupling means connecting said spoiler means to said control surface; said coupling means arranged to bias said spoiler means to a neutral position with respect to said control surface whereby relative movement of said spoiler means with respect to said control surface results solely from the natural inertia of said spoiler means upon movement of said control surface, said relative movement of said spoiler means with respect to said control surface acting to sustain said limited arcuate oscillatory movement of said control surface with respect to said airfoil.

2. The subject matter of claim 1, in which said coupling means connecting said spoiler means to said control surface comprises a cantilever rod, the natural resonant frequency of said spoiler means and rod being low, compared to said frequency of said arcuate oscillatory movement of said control surface.

3. In combination: an airfoil; a control surface for said airfoil; hinge means coupling said control surface to said airfoil for limited arcuate oscillatory movement of given frequency between two extreme arcuate positions with respect to said airfoil; locking means mounted on said airfoil and engageable with said control surface for holding said control surface in either of said extreme arcuate positions; means for releasing said locking means; spoiler means adjacent the trailing edge of said control surface for movement above and below said control surface; coupling means connecting said spoiler means to said control surface; said coupling means arranged to bias said spoiler means to a neutral position with respect to said control surface, whereby relative movement of said spoiler means with respect to said control surface results solely from the natural inertia of said spoiler means upon movement of said control surface, said relative movement of said spoiler means with respect to said control surface acting to sustain said limited arcuate oscillatory movement of said control surface with respect to said airfoil.

4. In combination: an airfoil; a control surface for said airfoil; hinge means coupling said control surface to said airfoil for limited arcuate oscillatory movement between two extreme arcuate positions with respect to said airfoil; spaced plungers mounted on said airfoil and arranged to engage a recess formed in said control surface to hold said control surface in either of said extreme arcuate positions; a solenoid associated with each plunger for retracting a respective plunger from said recess to release said control surface from said extreme arcuate position; control means for actuating said solenoids; spoiler means adjacent the trailing edge of said control surface for movement above and below said control surface; coupling means connecting said spoiler means to said control surface; said coupling means arranged to bias said spoiler means to a neutral position with respect to said control surface, whereby relative movement of said spoiler means with respect to said control surface results solely from the natural inertia of said spoiler means upon movement of said control surface, said relative movement of said spoiler means with respect to said control surface acting to sustain the limited arcuate oscillating movement of said control surface with respect to said airfoil.

5. Apparatus as claimed in claim 4 in which said control means comprises a square wave pulse generator for producing square wave signals of variable pulse width, a polarized relay connected to said square wave pulse generator, a source of current for said solenoids, said polarized relay being energized by said square wave pulse generator to alternately connect said source of current to said solenoids whereby said control surface is locked in one of said extreme arcuate positions for a longer period of time than in said other extreme arcuate position.

References Cited in the file of this patent

FOREIGN PATENTS 1,078,576   France _____ Mar. 12, 1954